(12) United States Patent
Moilanen et al.

(10) Patent No.: US 11,991,555 B2
(45) Date of Patent: May 21, 2024

(54) DYNAMIC RELIABILITY TARGET FOR WIRELESS NETWORKS

(71) Applicant: Nokia Technologies Oy, Espoo (FI)

(72) Inventors: Jani Moilanen, Helsinki (FI); Zexian Li, Espoo (FI); Lauri Kuru, Espoo (FI)

(73) Assignee: Nokia Technologies Oy, Espoo (FI)

( * ) Notice: Subject to any disclaimer, the term of this patent is extended or adjusted under 35 U.S.C. 154(b) by 279 days.

(21) Appl. No.: 17/285,266

(22) PCT Filed: Nov. 1, 2019

(86) PCT No.: PCT/IB2019/059398
§ 371 (c)(1),
(2) Date: Apr. 14, 2021

(87) PCT Pub. No.: WO2020/089851
PCT Pub. Date: May 7, 2020

(65) Prior Publication Data
US 2021/0377793 A1    Dec. 2, 2021

Related U.S. Application Data

(60) Provisional application No. 62/755,348, filed on Nov. 2, 2018.

(51) Int. Cl.
*H04W 28/04* (2009.01)
*H04L 1/20* (2006.01)
*H04L 43/0823* (2022.01)

(52) U.S. Cl.
CPC ............. *H04W 28/04* (2013.01); *H04L 1/203* (2013.01); *H04L 43/0847* (2013.01)

(58) Field of Classification Search
CPC ...... H04W 28/04; H04W 28/06; H04L 1/203; H04L 43/0847; H04L 1/188; H04L 1/08
See application file for complete search history.

(56) References Cited

U.S. PATENT DOCUMENTS

2006/0084389 A1\* 4/2006 Beale ................... H04L 1/0021
455/67.11
2011/0164507 A1 7/2011 Jeon
(Continued)

FOREIGN PATENT DOCUMENTS

CN        107888342 A       4/2018
EP        1054526 A1 \* 11/2000    ........... H04L 1/0003
(Continued)

OTHER PUBLICATIONS

3GPP TS 23.501 System Architecture for the 5G System version 15.3.0 (Sep. 2018) (Year: 2018).\*
(Continued)

*Primary Examiner* — Ayaz R Sheikh
*Assistant Examiner* — David Zhijun Sun
(74) *Attorney, Agent, or Firm* — Barta Jones, PLLC

(57) ABSTRACT

A method may include determining, by the network node for a flow, a plurality of reliability targets, wherein each reliability target of the plurality of reliability targets is associated with a different number of consecutive packet transmission errors for the flow and/or associated with a different value or range of values of a remaining survival time for the flow; determining, by the network node for a flow, a number of consecutive packet transmission errors or a remaining survival time for the flow; and determining, by the network node, a reliability target of the plurality of reliability targets, for a next packet transmission for the flow based on at least one of the number of consecutive packet transmission errors or the remaining survival time for the flow.

14 Claims, 10 Drawing Sheets

(56) References Cited

U.S. PATENT DOCUMENTS

2020/0044787 A1* 2/2020 Wang .................... H04L 1/1887
2021/0352525 A1* 11/2021 Hong .................... H04W 28/06

FOREIGN PATENT DOCUMENTS

| EP | 1054526 A1 | 11/2000 | |
|---|---|---|---|
| WO | WO-2005122497 A1 * | 12/2005 | ............. H04L 47/14 |
| WO | 2015/071530 A1 | 5/2015 | |

OTHER PUBLICATIONS

3GPP TS 38.423 Xn Application Protocol (XnAP) 15.0.0 (Jul. 2018) (Year: 2018).*

"3rd Generation Partnership Project;Technical Specification Group Radio Access Network; NG-RAN;Xn general aspects and principles (Release 15)", 3GPP TS 38.420, V15.0.0, Jun. 2018, pp. 1-13.

"3rd Generation Partnership Project;Technical Specification Group Radio Access Network;NG-RAN; Xn layer 1 (Release 15)", 3GPP TS 38.421, V15.0.0, Jun. 2018, pp. 1-6.

"3rd Generation Partnership Project;Technical Specification Group Radio Access Network;NG-RAN; Xn signalling transport (Release 15)", 3GPP TS 38.422, V15.0.0, Jun. 2018, pp. 1-8.

"3rd Generation Partnership Project;Technical Specification Group Radio Access Network;NG-RAN; Xn application protocol (XnAP)(Release 15)", 3GPP TS 38.423, V15.0.0, Jun. 2018, pp. 1-195.

"3rd Generation Partnership Project;Technical Specification Group Radio Access Network; NG-RAN; Xn data transport (Release 15)", 3GPP TS 38.424, V15.0.0, Jun. 2018, pp. 1-8.

"3rd Generation Partnership Project; Technical Specification Group Services and System Aspects; System Architecture for the 5G System; Stage 2 (Release 15)", 3GPP TS 23.501 V15.3.0, Sep. 2018, pp. 1-226.

"3rd Generation Partnership Project; Technical Specification Group Radio Access Network; NR; Radio Resource Control (RRC) protocol specification (Release 15)", 3GPP TS 38.331 V15.2.1, Jun. 2018, pp. 1-303.

"3rd Generation Partnership Project; Technical Specification Group Services and System Aspects; Study on Communication for Automation in Vertical Domains (Release 16)", 3GPP TR 22.804 V16.0.0, Jun. 2018, pp. 1-189.

"CyberCAV—22.104—Annex: Communication service availability vs PER", 3GPP TSG SA WG1 Meeting #83, S1-182213, Huawei, Aug. 20-24, 2018, 6 pages.

International Search Report and Written Opinion received for corresponding Patent Cooperation Treaty Application No. PCT/IB2019/059398, dated Jan. 24, 2020, 11 pages.

Office action received for corresponding European Patent Application No. 19798405.7, dated Feb. 28, 2023, 6 pages.

Office Action received for corresponding Chinese Patent Application No. 201980072220.6, dated Nov. 6, 2023, 6 pages of Office Action and no page of translation available.

* cited by examiner

DYNAMIC RELIABILITY TARGET FOR WIRELESS NETWORKS

PRIORITY CLAIM

This application claims priority to and the benefit of U.S. Provisional Patent Application No. 62/755,348, filed Nov. 2, 2018, entitled "DYNAMIC RELIABILITY TARGET FOR WIRELESS NETWORKS," the disclosure of which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as evolved NodeBs (eNBs), provide wireless access within a coverage area or cell. In LTE, mobile devices, or mobile stations are referred to as user equipments (UEs). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

According to an example implementation, a method includes determining, by a network node for a flow, a plurality of reliability targets, wherein each reliability target of the plurality of reliability targets is associated with at least one of a different number of consecutive packet transmission errors for the flow and/or associated with a different value or range of values of a remaining survival time for the flow; determining, by the network node for a flow, a number of consecutive packet transmission errors or a remaining survival time for the flow; and determining, by the network node, a reliability target of the plurality of reliability targets, for a next packet transmission for the flow based on at least one of the number of consecutive packet transmission errors or the remaining survival time for the flow.

According to an example implementation, an apparatus includes at least one processor and at least one memory including computer instructions, when executed by the at least one processor, cause the apparatus to: determine, by a network node for a flow, a plurality of reliability targets, wherein each reliability target of the plurality of reliability targets is associated with at least one of a different number of consecutive packet transmission errors for the flow and/or associated with a different value or range of values of a remaining survival time for the flow; determine, by the network node for a flow, a number of consecutive packet transmission errors or a remaining survival time for the flow; and determine, by the network node, a reliability target of the plurality of reliability targets, for a next packet transmission for the flow based on at least one of the number of consecutive packet transmission errors or the remaining survival time for the flow.

According to an example implementation, a non-transitory computer-readable storage medium comprising instructions stored thereon that, when executed by at least one processor, are configured to cause a computing system to perform a method of determining, by a network node for a flow, a plurality of reliability targets, wherein each reliability target of the plurality of reliability targets is associated with at least one of a different number of consecutive packet transmission errors for the flow and/or associated with a different value or range of values of a remaining survival time for the flow; determining, by the network node for a flow, a number of consecutive packet transmission errors or a remaining survival time for the flow; and determining, by the network node, a reliability target of the plurality of reliability targets, for a next packet transmission for the flow based on at least one of the number of consecutive packet transmission errors or the remaining survival time for the flow.

According to an example implementation, a method may include determining, by a network node for a flow, a number of consecutive packet transmission errors or a remaining survival time for the flow; and selecting, by the network node, a reliability target, of a plurality of different reliability targets, for a next packet transmission for the flow based on at least one of the number of consecutive packet transmission errors or the remaining survival time for the flow.

According to an example implementation, an apparatus includes at least one processor and at least one memory including computer instructions, when executed by the at least one processor, cause the apparatus to: determine, by a network node for a flow, a number of consecutive packet transmission errors or a remaining survival time for the flow; and select, by the network node, a reliability target, of a plurality of different reliability targets, for a next packet transmission for the flow based on at least one of the number of consecutive packet transmission errors or the remaining survival time for the flow.

According to an example implementation, a non-transitory computer-readable storage medium comprising instructions stored thereon that, when executed by at least one processor, are configured to cause a computing system to perform a method of determining, by a network node for a flow, a number of consecutive packet transmission errors or a remaining survival time for the flow; and selecting, by the network node, a reliability target, of a plurality of different reliability targets, for a next packet transmission for the flow based on at least one of the number of consecutive packet transmission errors or the remaining survival time for the flow.

According to an example implementation, a method may include determining, by a network node for a flow, a number of consecutive packet transmission errors for the flow; and selecting, by the network node, a reliability target, of a plurality of different reliability targets, for a next packet transmission for the flow based on at least the number of consecutive packet transmission errors for the flow.

According to an example implementation, an apparatus includes at least one processor and at least one memory including computer instructions, when executed by the at least one processor, cause the apparatus to: determine, by a network node for a flow, a number of consecutive packet transmission errors for the flow; and select, by the network node, a reliability target, of a plurality of different reliability targets, for a next packet transmission for the flow based on at least the number of consecutive packet transmission errors for the flow.

According to an example implementation, a non-transitory computer-readable storage medium comprising instructions stored thereon that, when executed by at least one processor, are configured to cause a computing system to perform a method of determining, by a network node for a flow, a number of consecutive packet transmission errors for the flow; and selecting, by the network node, a reliability target, of a plurality of different reliability targets, for a next packet transmission for the flow based on at least the number of consecutive packet transmission errors for the flow.

According to an example implementation, a method may include determining, by a network node for a flow, a remaining survival time for the flow; and selecting, by the network node, a reliability target, of a plurality of different reliability targets, for a next packet transmission for the flow based on at least the remaining survival time for the flow.

According to an example implementation, an apparatus includes at least one processor and at least one memory including computer instructions, when executed by the at least one processor, cause the apparatus to: determine, by a network node for a flow, a remaining survival time for the flow; and select, by the network node, a reliability target, of a plurality of different reliability targets, for a next packet transmission for the flow based on at least the remaining survival time for the flow.

According to an example implementation, a non-transitory computer-readable storage medium comprising instructions stored thereon that, when executed by at least one processor, are configured to cause a computing system to perform a method of determining, by a network node for a flow, a remaining survival time for the flow; and selecting, by the network node, a reliability target, of a plurality of different reliability targets, for a next packet transmission for the flow based on at least the remaining survival time for the flow.

The details of one or more examples of implementations are set forth in the accompanying drawings and the description below. Other features will be apparent from the description and drawings, and from the claims.

DETAILED DESCRIPTION

Figure 1:
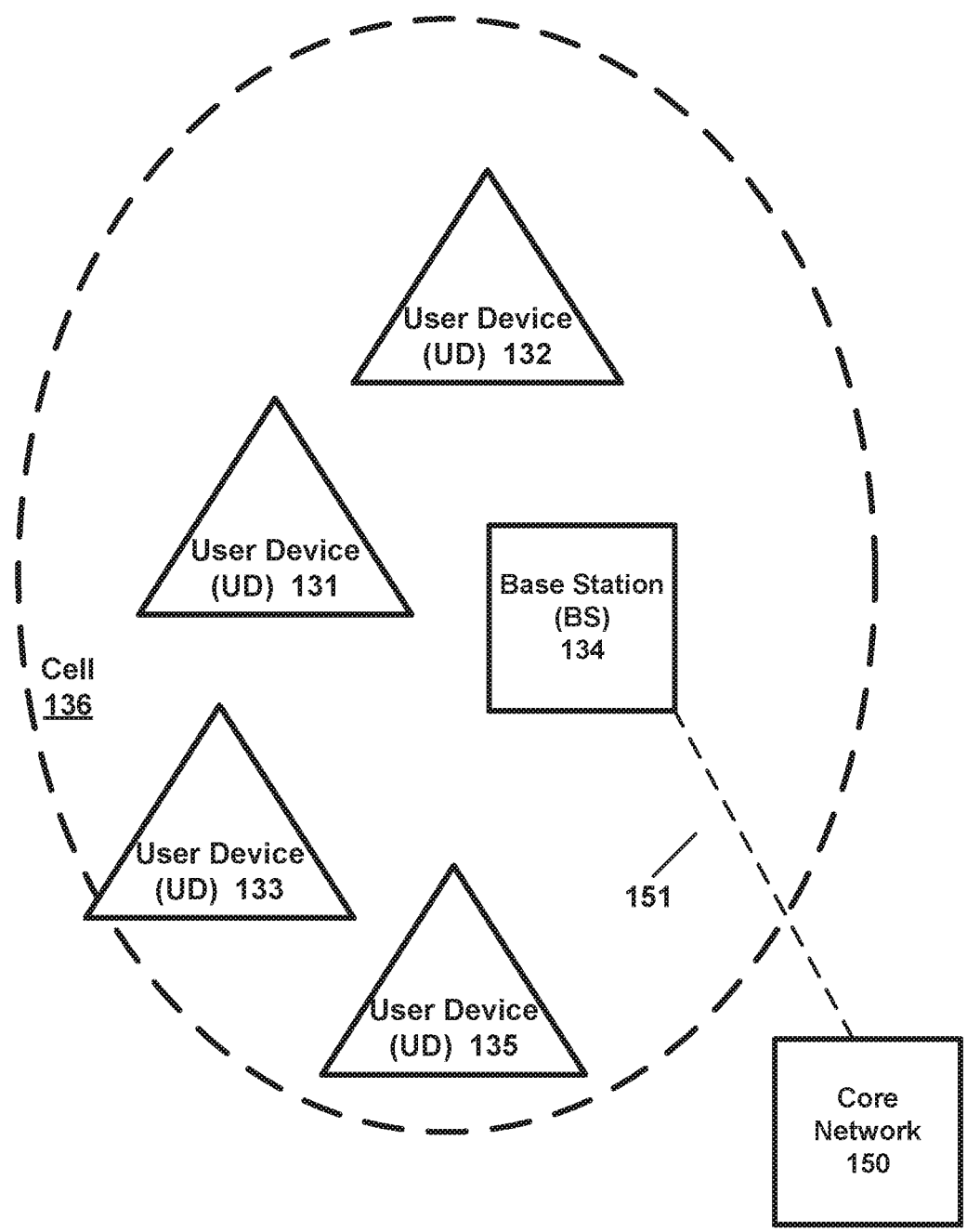
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipments (UEs), may be connected (and in communication) with a base station (BS) 134, which may also be referred to as an access point (AP), an evolved NodeB (eNB), next generation NodeB (gNB) or a network node. At least part of the functionalities of an access point (AP), base station (BS), (e)NodeB (eNB) or gNB may also be carried out by any node, server or host which may be operably coupled to a transceiver, such as a remote radio head (RRH). BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. 5G New Radio (NR) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for 5G New Radio (NR) systems. This enables emerging new applications and services, such as industrial automations, autonomous driving, vehicular safety, e-health services, and so on. 3GPP Rel-15 targets in providing connectivity with reliability corresponding to packet error rate (PER) of $10^{-5}$ and up to 1 ms U-Plane (user/data plane) latency, by way of illustrative example. Thus, for example, URLLC user devices/UEs may require a significantly lower packet error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

One example challenge is that URLLC sets new, more stringent optimization criteria for the network deployments; Networks must support ultra-high reliability (e.g., in some cases, for example, 99.999% reliability or higher), and in some case also extremely low e2e (end-to-end) latency and jitter (e.g., guaranteed, deterministic latency of 1 ms and low level jitter).

Current QoS (quality of service) definitions (e.g., in TS 23.501) for URLLC provide only the following parameters regarding latency and reliability (Packet Delay Budget, Packet Error Rate, and Maximum Packet Loss Rate):

1) The Packet Delay Budget (PDB)—which may define an upper bound for the time that a packet may be delayed between the UE and the UPF that terminates the N6 interface 2) The Packet Error Rate (PER)—which defines an upper bound for the rate of protocol data units (PDUs) (e.g., Internet Protocol (IP) packets) that have been processed by a sender (or sending wireless node), but are not successfully delivered to an upper layer of the receiver (or receiving wireless node). Thus, for example, a PER may define an upper bound for the rate of PDUs (e.g. IP packets) that have been processed by the sender of a link layer protocol (e.g. RLC in RAN of a 3GPP access) but that are not successfully delivered by the corresponding receiver to the upper layer (e.g. PDCP in RAN of a 3GPP access).

Packet Error Rate may also be referred to as Packet Error Ratio (PER). According to an illustrative example implementation, packet error ratio (PER) may the ratio of PDUs (e.g., IP packets containing sensor updates) that have been received by a source PDU layer (e.g., UE) via the ingress communication service interface in a certain time period T but that are not successfully delivered within a specified deadline by the target PDU layer (e.g., UPF (user plane function)) to the egress communication service interface in the same time period T. Thus, an example of Packet Error Ratio may include:

$$PER = \frac{\text{Number of } PDUs \text{ not successfully delivered by target } PDU \text{ layer to egress interface during time period } T}{\text{Number of } PDUs \text{ received by source } PDU \text{ layer via ingress interface during time period } T}$$

3) Maximum Packet Loss Rate (applicable for voice traffic only), which indicating the maximum value (or rate) of lost or undelivered packets.

The current QoS definition does not consider that many (if not most) of the URLLC use cases (and possibly other applications) may be able to tolerate individual packet errors (a single packet transmission error), while multiple consecutive packet transmission errors, or failing to deliver any packet correctly within a specified 'survival time', may typically lead to a failure at the application level (e.g., failure of the URLLC application), which can have more critical impacts if, e.g., an entire system goes to an emergency mode and/or becomes unavailable or inoperative due to the multiple consecutive packet transmission errors. In terms of design for high reliability it may be, for example, the application level failure rate which may be considered when system level reliability is determined or examined.

According to an example embodiment, Tr may refer to a remaining survival time for a flow. A survival time (Ts) for a flow may refer to the period of time (e.g., a sliding window) during which one or more consecutive errors has occurred, and the application, system or UE associated with the flow remains available or operative (not failed). Thus, after a first packet transmission failure has been detected or occurred, the elapsed time (t) may be measured, until a packet is successfully received (time t is then reset to zero). According to an example embodiment, Tr=Ts−t. Thus, the remaining survival time (Tr) for a flow may be the survival time for the flow minus the elapsed time (t) since a first packet transmission error occurred. In an example embodiment, when the elapsed time (t) reaches or becomes equal to the survival time (Ts), this means the remaining survival time (Tr) is now zero, and the application, system or UE associated with the flow may fail or become inoperative (or become unavailable to perform its operations or functions), which is undesirable. When a packet is successfully received, then the elapsed time (t) is reset to zero, and does not resume counting until a packet transmission error has been detected.

For example, losing an individual (or single) packet (a single packet transmission error) may reduce quality of experience (QoE) of a motion control system slightly (e.g., motion accuracy of a robotic arm may be temporarily reduced), while losing a threshold number of packets (e.g., losing 2 or 3 consecutive packets or 2-3 consecutive packet transmission errors depending on the configuration) may trigger a safety mode for this motion control system application (e.g., an application or system failure), which stops the robot(s) completely. Similarly, as another example, an elevator control system may be able to tolerate up to 5 consecutive packet losses up to 5 packet transmission errors)

without any major impact on elevator operation, while losing 6 or more consecutive packets (6 or more packet transmission errors) triggers an elevator safety mode and the elevator drives slowly to the first floor to wait for a repair (and thus, in this example, the elevator/elevator control application has failed, and is no longer available or operational after 6 or more consecutive packet transmission errors). Yet another example is remotely controlled cranes, where losing one or two packets from time to time will not bring any damage, or cause a failure of the crane control application. However, one example problem is that if the number of consecutive packet transmission errors is larger than a preconfigured threshold, this will cause the application, device or system to fail, and then perform an "emergency" stop or application shutdown, which could lead to a serious damage even to the hardware or system as well on top of the disruption of the normal operation. Alternatively, an elapsed time counter can be always reset to zero when a packet is received successfully, and it resumes counting immediately.

These are just few examples, and similar requirements may apply to many other URLLC use cases or other applications. Thus, for example, it may be a good design for an application to tolerate a single packet transmission error (or generally tolerate a very limited number of packet transmission errors), to allow for continued system/application availability in such a case of one or a very limited number of consecutive packet transmission errors.

A packet error or packet transmission error may, for example, include one or more of: a packet being lost (packet not delivered), a packet being delayed beyond latency requirement or latency budget (too late or too early delivery of packet), a packet delivered only partially, a packet delivered with unwanted alterations (e.g., a corrupted packet). Thus, in some cases, a packet transmission error may be detected by a network node not receiving the packet, or the network node's inability to successfully decode the packet, or the network node receiving a NACK, or a failure to receive an ACK for a packet. These are some illustrative examples, and other techniques may be used to detect a packet transmission error.

Therefore, according to an example embodiment, a network node may determine a reliability target, of a plurality of reliability targets, for a next packet transmission for a flow based on at least one of a number (M) consecutive packet transmission errors or a remaining survival time (Tr) for the flow. In this manner, a network node, (e.g., such as a BS, eNB, gNB, access point (AP), user device or UE, wireless relay node, or a core network entity, or a RAN (radio access network) node) may dynamically change or adjust a reliability target for a next packet transmission, e.g., based on either a number (M) consecutive packet transmission errors or a remaining survival time (Tr) for the flow. For example, this may allow a more relaxed reliability target (e.g., a packet error rate or packet error ratio (PER) of $1 \times 10^{-2}$) to be selected initially, e.g., for M=0 consecutive packet transmission errors, and then, after one or more consecutive packet transmission errors (e.g., M=1, 2 . . . N) have been detected by the network node or a remaining survival time for the flow is less than a threshold, then a stricter reliability target may be selected for a next packet transmission, based on M (the number of consecutive packet transmission errors) and/or a remaining survival time (Tr) for the flow.

For example, a variety of different types of reliability targets may be used. For example, one or more of the following types of reliability targets may be used, by way of example: a packet error rate (PER) or packet error ratio (PER) target; a packet error probability (PEP) target; an availability target (e.g., a cumulative time an application or UE has spent in an unavailable time or failed state divided by total time); a reliability target (e.g., reliability indicates how long a system is able to maintain correct operation, or is available for operation, and may be measured as mean time between failure or probability of failure within a specified time interval); a failure rate (e.g., failure rate may include a frequency with which an application, system or component fails, expressed in failures per unit of time); a latency requirement target or latency budget (e.g., an amount of latency between two events, such as amount of time at a node between sending data and receiving data, where a latency beyond the latency budget may cause a failure of the application or system); and any other quality of service (QoS) parameter (e.g., since one or more of the above may be considered to be QoS parameters).

Also, a reliability target, or a plurality or reliability targets, may be provided, determined or selected, for a flow (or per flow). A flow may generally include a group or stream of packets transmitted to or from a UE. The flow may also be application-specific, e.g., the flow may be associated with a specific application or set of applications (e.g., video application, a social media application, a robot control application, or a self driving car application) running on the UE (thus, in such a case, the flow may be associated with both a UE and a particular application running on the UE). A flow may be a QoS flow, which may include a group or stream of packets to or from a UE that are for or associated with a particular QoS classification or a specific set of QoS parameters. For example, a QoS flow may include a group or stream of packets to or from one or more applications (e.g., running on the same UE) that are mapped to a specific QoS or QoS classification e.g., (where each different QoS or QoS classification may have an associated set of QoS requirements). Thus, for example, different flows may have different reliability requirements.

Thus, according to an example embodiment, rather than having a single or fixed reliability target, (e.g., a single PER target) for a flow, a more dynamic approach may be provided in which there may be multiple (or a plurality of) reliability targets, with each reliability target associated with (or used for) a different number (M) of consecutive packet transmission errors that have occurred for the flow or associated with a different value or a different range of values for a remaining survival time (Tr) for the flow.

A variable M may refer to the number of consecutive packet transmission errors that have occurred. M=0 means that no packet errors have occurred since the successful receipt of a last packet. M=1 means that 1 packet transmission error has occurred, M=2 means that 2 consecutive packet transmission errors have occurred, etc. For example, as noted above, a packet transmission error may include, e.g.: lost packets, packets that were received but not decoded and packets successfully received but beyond the required latency budget. A network node may determine a reliability target (e.g., PER) for a next packet transmission, based on the number of consecutive packet transmission errors, e.g., M=0, 1, 2, . . . (N-1). According to an illustrative example, when M=N, this may indicate that a failure has occurred for the application, system or UE associated with the flow. Thus, a reliability target (such as a PER target) may be determined by a network node for different values of M: $PER_0$ for M=0; $PER_1$ for M=1, $PER_2$ for M=2, . . . .

Also, as noted, Tr may refer to the remaining survival time for the flow. A survival time (Ts) for a flow may refer to the period of time (e.g., a sliding time window) during which one or more consecutive errors has occurred, and the application, system or UE associated with the flow remains available or operative (not failed). Thus, after a first packet transmission failure has been detected or occurred, the elapsed time (t) may be measured, until a packet is successfully received (time t is then reset to zero). According to an example embodiment, Tr=Ts-t. Thus, the remaining survival time for a flow may be the survival time for the flow minus the elapsed time (t) since a first packet transmission error occurred. A network node may determine a reliability target (e.g., PER) for a next packet transmission, based on Tr. Thus, a reliability target (such as a PER target) may be determined by a network node for different values (or range of values of Tr).

Different reliability targets (e.g., different PER targets) for a network node may cause the network node (e.g., one or more layers of the network node) to adjust one or more communication parameters or a configuration for the flow, e.g., in order to try to meet the reliability target for the next packet transmission. Thus, for example, in response to determining a reliability target (e.g., PER, of a plurality of reliability targets) based on M or Tr for the flow, the network node may adjust or vary one or more types of resources, e.g., depending on the reliability target. For example, less resources may be used for the next packet transmission of the flow for a lower value of M and/or a higher Tr, and (as more packet transmission errors occur or as more elapsed time t occurs, causing Tr to become smaller) more resources may be applied or configured by the network node for the next packet transmission. In this manner, less resources may be applied initially for packet transmissions for a flow when there is a low risk of a system or application failure (e.g., M is small, and/or Tr is large), and more resources may be applied to provide a higher probability of a next packet transmission as the probability or likelihood of an application of system failure becomes greater (e.g., as M increases, and/or as Tr decreases). Thus, use of a dynamic reliability target, e.g., in which a different reliability target may be determined as a number of packet transmission errors (M) changes (e.g., increases) or as a remaining survival time (Tr) changes (e.g., decreases) for the flow, may allow a more efficient use of resources (e.g., less resources to be applied for a flow when there is a low risk of application or system failure, and more resources to be applied to a flow to prevent application or system failure, as the risk of failure increases). Thus, for example, the use of a dynamic reliability target for a flow may improve the efficient use of resources, while decreasing the application or system failure rate, e.g., especially for applications or systems that can tolerate a small number of packet transmission errors (M) less than a threshold or can tolerate packet transmission error(s) up to a survival time (Ts).

As noted, a network node may determine a reliability target (e.g., target PER) for a next packet transmission for the flow based on M (a number of consecutive packet transmission errors) and/or Tr (a remaining survival time for the flow). Then the network node may adjust a communication parameter or configuration for the flow based on the reliability target for the next packet transmission. For example, adjusting a communication parameter or configuration for the flow may include, e.g., adjusting one or more resources for the flow, such as adjusting (e.g., increasing use of): time-frequency resources, power transmission resources (e.g., transmission power), multi-carrier or multi-link resources (adding one or more carriers or wireless links), semi-persistent scheduling of resources, spatial resources (use of additional antennas), etc. Thus, in an example embodiment, adjusting a communication parameter or configuration for a flow may generally include one or more of the following: adjusting a modulation and coding scheme (MCS) for the flow; adjusting transmission power for the flow; configuring use of multi-connectivity that provides multiple wireless links for the flow; configuring use of multi-carrier, that provides multiple carriers for the flow; configuring use of transmission of duplicate data or duplicate packets on two or more wireless links for the flow; configuring use of interference coordination for the flow; and configuring use or change of semi-persistent scheduling of resources for the flow; adjusting a time diversity by configuring a repeat transmission of data over time for the flow; performing further link adaptation; adjusting a frequency diversity by configuring carrier aggregation or frequency hopping for the flow; adjusting a spatial diversity by adjusting a number of transmit/receive antennas used for the flow; and configuring cooperative diversity or sidelink assistance, in which a transmitted packet of the flow is received by multiple user devices, and wherein at least one of the user devices forwards or relays the packet to the other user device to increase reliability.

According to an example embodiment, different techniques may be used by a network node to detect a packet transmission error. In uplink (UL), this may be done based on a decoding outcome (erroneous or corrupted packet will prevent decoding of the packet) or based on not receiving anything (missing packet). For downlink (DL) data, this may be done based on a status reports sent by UE (HARQ and/or ARQ feedback, of ACK or NACK for the packet) or a lack of a status report (status report lost, and BS/network node may assume a NACK for the packet). Thus, for example, 1) For UL data: BS can determine if a packet is successfully decoded or not at BS, or is not received by BS within a timeout (if not successfully decoded or not received, then this is a packet transmission error); thus, the network node (e.g., BS) can count the number of consecutive packet transmission errors, until a packet is successfully received (in which case M is reset to zero). 2) For DL data: Network node can determine a packet transmission error based on HARQ feedback (e.g., ACK/NACK for each packet) from UE. For example, network node receiving a NACK, or a failure of network node to receive an ACK within a timeout, for each transmitted packet, indicates a packet transmission error. For both UL data and DL data, the network node may count packet transmission errors (M), or determine an amount of elapsed time (t) since first packet transmission error, and compare t to Ts, or calculate Tr based on Ts and t. (e.g., Tr=Ts-t).

Example: According to an illustrative example, here are some example reliability targets (e.g., PER targets) for a flow where failure of the application or system associated with the flow occurs at M=3.

PER1=$1 \times 10^{-2}$ for M=0 (no packet transmission errors)
PER2=$1 \times 10^{-4}$ for M=1 (1 packet transmission error);
PER3=$1 \times 10^{-6}$ for M=2 (2 consecutive packet transmission errors).

Initially, there is little or no risk of application failure. Thus, in this illustrative example, when M=0 (no packet transmission errors), the network node determines or selects the associated target PER (PER1) for a next packet transmission (for M=0). In this example, based on the PER1=$1 \times 10^{-2}$, the network node may use (for the next packet transmission), a high MCS, and a small amount of time-frequency resources, and a small (or relatively low) transmission power, etc., may be used for a next packet transmission.

After a first packet transmission error is detected by the network node (M=1), the network node may select the associated PER target (PER2, associated with M=1), and then may adjust one or more communication parameters or configuration for the flow based on the selected PER target (based on PER2): For example, based on the higher PER target of PER2=$1\times10^{-4}$ for M=1 (1 packet transmission error), the network node may apply more resources, e.g., select a lower (more robust) MCS, which requires a larger number of time-frequency resources (e.g., lower modulation scheme), and increases transmission power for transmission of the packet.

In this example, if a second consecutive packet transmission error occurs (M=2), then the network node determines or selects the associated PER target (PER3)=$1\times10^{-6}$ for M=2 (2 consecutive packet transmission errors). In this example, because of the much higher (much stricter) target PER (PER3=$1\times10^{-6}$), the network node may adjust a communication parameter(s) or configuration for a next packet transmission for the flow based on this target PER (PER3), by allocating significantly more resources to the flow, in attempt to meet the target PER and/or prevent failure of the application or system associated with the flow. Thus, in this illustrative example, the network node may further increase transmission power, use a lowest possible MCS (e.g., a most robust MCS), and then configure or activate previously configured multi-connectivity communication with the UE, e.g., by configuring/activating a secondary wireless link to the UE via a secondary BS, and also where data is duplicated to the UE via both a primary link (via the network node or primary BS), and via the secondary link(s) (via the secondary BS(s)). Also, spatial diversity may be increased, e.g., to use two or more antennas at the transmitter and receiver. These are just a few examples of adjustments to communication parameters and/or configurations that may be performed by a network node based on the reliability target (e.g., target PER), or based on a dynamic PER or changing PER. Thus, different communication parameters and/or configurations may be used for transmission of a next packet transmission for different selected reliability targets (e.g., for different target PERs). The packet is then transmitted or received by the network node based on the adjusted communication parameters and configuration (based on the selected target PER associated with M or Tr).

According to an example implementation, reliability target information may be sent or provided to the network node (e.g., from a core network entity, a UE, another BS, or other entity). For example, reliability target information may include any information that may allow the network node to determine a plurality of reliability targets for different values of M and Tr and/or to select or determine a reliability target for a specific M or Tr.

The reliability target information may include different types of information, such as, for example (in these examples the reliability target is a PER target, but a number of different types of reliability targets may be used): 1) a value N, and a maximum allowed PER (e.g., $1\times10^{-6}$) (which may be referred to as N-PER) that may be used after N consecutive packet transmission errors; 2) a survival time (Ts), and a maximum allowed PER (which may be referred to as S-PER) that may be used after the survival time has expired or Tr=0; 3) one or more parameters (e.g., k and To) that can be used by the network node to determine PER target(s) for different values of M and Tr; and 4) a table of PER target values (one PER target for each of the different values of M or Tr).

Thus, for example, the network node may receive the reliability target information. The network node may determine a plurality of reliability targets (e.g., PER targets), e.g., based on the reliability target information. The network node may then determine a value for M (a number of consecutive packet transmission errors), or Tr (a remaining survival time) for the flow. The network node may, for example, determine a reliability target of the plurality of reliability targets, for a next packet transmission based on at least one of the number (M) of consecutive packet transmission errors or the remaining survival time (Tr) for the flow. The network node may then adjust a communication parameter(s) or configuration for the flow based on the reliability target for the next packet transmission for the flow. The network node may transmit or receive the next packet for the flow via or based on the adjusted communication parameter or configuration.

Various aspects or various example embodiments will be described.

(1) A new QoS attribute is introduced in 5G QoS domain and provided to RAN (radio access network) indicating at least:
    a) value "N" and maximum allowed PER after N-consecutive errors ("N-PER"), or
    b) survival time ("Ts") and maximum allowed PER after the survival time expired ("S-PER")

The terms "N-PER" and "S-PER" may refer to any indication that essentially provides a reliability target for N-consecutive packet transfer errors, or errors within a survival time. For example, instead of PER, also any other indications of reliability can be alternatively used as, such as
    Packet Error Probability (PEP), or
    Reliability index, which refers to a pre-configured values of a reliability targets, and indicates the current reliability target.

The new QoS (quality of service, or reliability) parameters (N-PER or S-PER, and their related attributes) may be provided to RAN (BS or UE or other RAN node) by the application layer (via interfaces to CN or UE) as part of the QoS flow setup process, but also other implementation options can be foreseen outside the normal QoS framework (e.g. the new attribute could be tied to some specific application type which could be identified by a packet inspection algorithm).

(2) In case of (1) a ("N-PER"), RAN (or network node) selects dynamically the PER target for the next packet transmission ("$PER_{next}$"), or (target-$PER_{next}$) based on "N-PER" and current number of observed consecutive errors ("M").
    a) M=j−s−1, where s is the index of previous successfully transferred packet, and j is the index of next packet to be transferred (for j=1, M is set to 0).
    b) PER target for the next packet is determined by function. $f_{PER}(M)$, where $f_{PER}(k)$>N-PER at least for one value of k∈[0,N [. PER target for next packet transmission is a function of M (no. of observed consecutive packet errors).

Packet error means that packet is lost, corrupted, or packet transfer delay requirements are not met (minimum or maximum delay, and/or jitter requirement is not fulfilled).

"Next packet" refers primarily to a transmission of a new packet. However, in some cases the dynamic PER target could be applied also for re-transmissions (e.g., in case of "S-PER", if there are no new packets and remaining survival time is below some threshold, RAN or network node could decide to re-transmit with a higher PER target if the latency requirements allow it).

(3) In case of (1)b ("S-PER"), RAN or the network node selects dynamically the PER target for the next packet transmission ("PER$_{next}$") based on "S-PER" and remaining survival time ("Tr").
  a) Tr=max(0, Ts−t), where t denotes the time elapsed since previous successful packet transfer (in the flow initialization or latest at arrival of first packet, Tr is set to Ts);
  b) PER target for the next packet is determined by function f$_{PER}$(Tr), where f$_{PER}$(t)>S-PER at least for one value oft 0≤t<Ts PER target for next packet is a function of remaining survival time.

(4) Optionally, a table of PER targets is provided to RAN (network node).
  a) In case of "N-PER", the PER targets for 1 to (N−1) consecutive packet errors could be determined by RAN (network node) without any additional information (e.g. based on its' estimate of most efficient settings it has learned from historical data). However, in some further embodiments it may be desirable to apply external control and provide a table of PER targets (or other reliability indication) also for the 1 to (N−1) consecutive errors. Such table could be provided to RAN (network node), e.g., by CN (core network), a network management system, or application as part of QoS parameter negotiation (allowing application specific optimization).

Thus, RAN (network node) or CN may define M-specific PER values:
  PER$_1$, for M=0, (M is no. of observed consecutive packet errors).
  PER$_2$, for M=1,
  PER$_N$="N-PER", for M=N−1.

Similarly, in case of "S-PER", a table for PER targets could be provided. E.g., (Tr is remaining survival time)—CN or RAN (network node) may define a per-Tr PER:
  PER$_1$, for T$_1$<=Tr<Ts.
  PER$_2$, for T$_2$<=Tr<T$_1$.
  PER$_N$="S-PER", for 0<=Tr<T$_{N-1}$.

(5) Optionally, parameters of a function indicating value of PER targets are provided to RAN (or network node) (e.g., instead of providing a table, the UE and BS can calculate the PERs, based on a parameter or information that is provided).
  a) For example, it could be defined that PER target is a linear function of Tr (in case of "S-PER") or M (in case of "N-PER")—can indicate it's a linear function:
    PERnext=f$_{PER}$(Tr)=1e$^{k*Tr+T0}$ where k and T$_0$ are parameters provided to RAN or network node or may provide parameters to indicate PER;
    PERnext=f$_{PER}$(M)=1e$^{k*M+T0}$ and k and T$_0$ are parameters provided to RAN or network node.

(6) Optionally, a first network entity (e.g., BS, or master BS, to a secondary BS) transmits PER$_{next}$ (among other QoS parameters) to a second network entity.
  a) Master BS—may activate packet duplication on secondary link—for 1 or more target PER values. Master BS may send a subset of PER table, activate secondary link after receiving a NACK from receiver. For example, as part of PDCP layer multi-connectivity, master gNB could utilize the dynamic PER targets to decide whether or not it should activate PDCP layer packet duplication to enhance packet error probability, as well as to indicate the current PER target value to a secondary gNB.
  b) Master gNB (or other multi-connectivity controller) manages the secondary gNB target PER (secondary node cannot know it otherwise, since it has only its own observations).

(7) Optionally, RAN (network node) may allocate SPS (semi-persistent scheduling) resources in a more optimized way to reduce resource waste. SPS—configure periodic resource to UE, and UE can use SPS resource without submitting an UL resource request each time; SPS can be used for both UL or DL.
  a) When allocating SPS resource (e.g. for uplink), the pre-allocation of resources could be made assuming the strictest PER target (M=N) to ensure that sufficient resources are always available to maximize the reliability.
  b) In addition, a dynamic indication is used to denote if only part of the semi-persistently allocated resources is needed for the next packet(s) (in case of M<N) allowing others to utilize the unused resources. The value of the dynamic indication is based on received feedback for previous transmissions. The length of the dynamic indication will determine the granularity of the resource change.
  c) For example: SPS may allocate 10 physical resource blocks (PRBs) every period, for certain PER target(s); if no errors happen, then only need to use less (e.g., 8) PRBs; then transmitter can increase MCS, and transmit the same data over fewer PRBs, and have some PRBs left over, this is for cyclic/periodical traffic, e.g., factory robots sending status or control information; SPS may be especially useful in those fixed period or periodic traffic applications.

(8) Optionally, RAN (Network node) could allocate SPS resources in a more optimized way to reduce the probability of consecutive errors. SPS size of resource: 1 PRB for the first packet, 2 PRBs for second packet, or 10 PRBs for third packet. For N=3. Thus, by increasing number of PRBS allocated to three consecutive packets, from 1, 2 10, this likely avoids three consecutive packet errors, and thus, M=N application failure.
  a) When allocating SPS resource, the resource sizes for consecutive transmission may follow a pre-defined repeating pattern according to PER targets for 0 to N−1 observed consecutive errors. (where N is the N corresponding to post-N-error-PER)—PER target may change based on M or Tr.
  b) One simple example of such pattern is that every Nth allocation is large enough to carry packets with PER target assuming M=N−1, while other allocations assume M=0.
  c) This is not as optimal in terms of resource usage as (5), but has the benefit of avoiding the need for dynamic configuration (i.e., simplifies the implementation).

Some example advantages of these techniques or approach is that may use of more relaxed reliability requirements (PER targets) while still meeting the applications' requirements. The more relaxed PER targets translate directly to number of benefits, such as lower resource usage, lower interference, higher spectral efficiency, higher capacity, and lower costs (e.g., spectrum costs). This may also avoid having the network node treating each packet equally (with equally robust transmission schemes) which means unnecessary resource waste. Thus, more relaxed PER targets may generally be used. However, when one or more packet transmission errors are detected, then more resources or more robust techniques may be adjusted or configured by the network node to reduce the likelihood that the application or system associated with the flow will suffer a failure due to further packet transmission error(s). Thus, these techniques that use a dynamic or adjustable reliability targets or target PERs, may provide a more efficient use of resources, while decreasing application failures. Thus, these techniques may be referred to as dynamic reliability targets or dynamic QoS targets.

Figure 2:
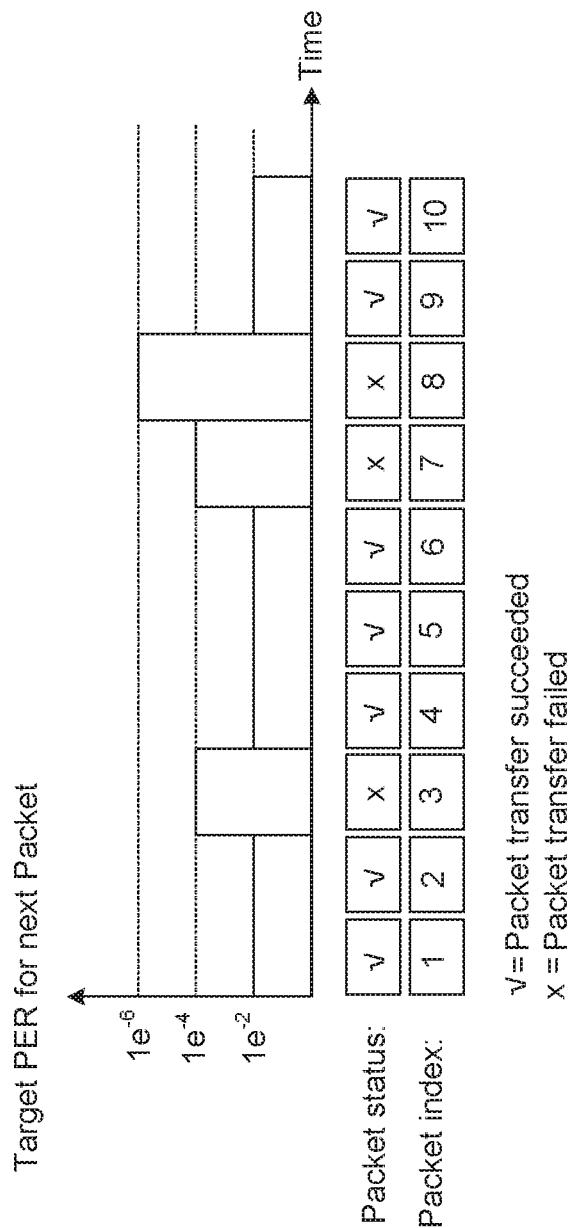
FIG. 2 is a diagram illustrating use of a dynamic PER based on a number (M) of consecutive transmission packet errors.

FIG. 2 is a diagram illustrating use of a dynamic PER based on a number (M) of consecutive transmission packet errors. The target PER is shown for the next packet. In this example application requirement is that maximum 3 consecutive errors are allowed to happen with <$10^{-6}$ probability, and PER targets $10^{-2}$ for M=1, $10^{-4}$ for M=2 and $10^{-6}$ for M>2, are chosen to be used.

For the first two packets, the network node uses a PER target of $10^{-2}$, but when a packet error is detected for the $3^{rd}$ packet, the RAN node or network node changes (or determines or selects) a PER target (shown at packet 3) to $10^{-4}$ for the transmission of the $4^{th}$ (or next) packet. Since the $4^{th}$ packet is again successfully transferred, the network node changes the PER target back to $10^{-2}$. Again, a packet transmission error for the $7^{th}$ packet is detected and a PER target (for the next packet transmission) is changed to $10^{-4}$ for packet 8, but since error is detect also for $8^{th}$ packet, the PER target is further decreased to $10^{-6}$. Overall, in this type of example ~99% of transmissions could use $10^{-2}$ as PER target, ~0.99% would use $10^{4}$, and only ~0.0001% would need to use the strictest $10^{-6}$ PER requirement. Thus, these techniques that use dynamic QoS, or dynamic reliability targets per flow, e.g., based on M or Tr, may result in significant improvement in resource efficiency, while reducing application or system failures.

The exact selection of the "more relaxed PER targets" (target PER after N−1, N−2, . . . , 0 consecutive errors) could alternatively be made by network node or RAN node, e.g., based on current channel conditions, expected interference level, observed earlier packet errors, a configuration (e.g. table) received from core network or network mgmt. system, or given as input as part of QoS parameters. 5G system (5GS) or network management system could also collect statistics, e.g., per QoS-class and adjust target PER dynamically so that application level faults are within the requirement.

Figure 3:
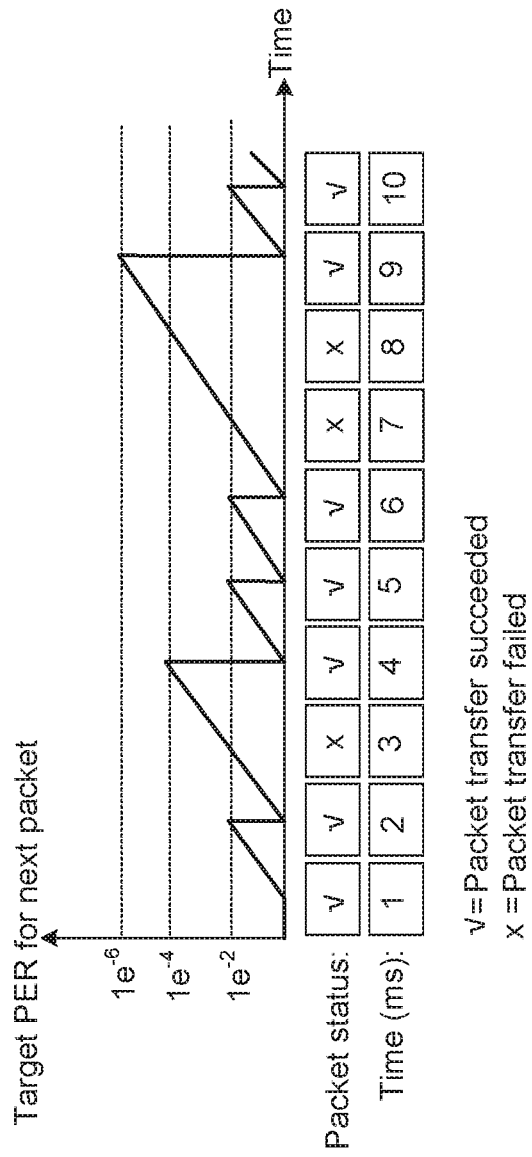
FIG. 3 is a diagram illustrating use of a dynamic PER based on a remaining survival time (Tr) of a flow.

FIG. 3 is a diagram illustrating use of a dynamic PER based on a remaining survival time (Tr) of a flow. The target PER is shown for the next packet. In this example, the PER target is a linear function of Tr, but it could be in principle implemented as any other monotonically decreasing function (e.g., a step function).

Figure 4:
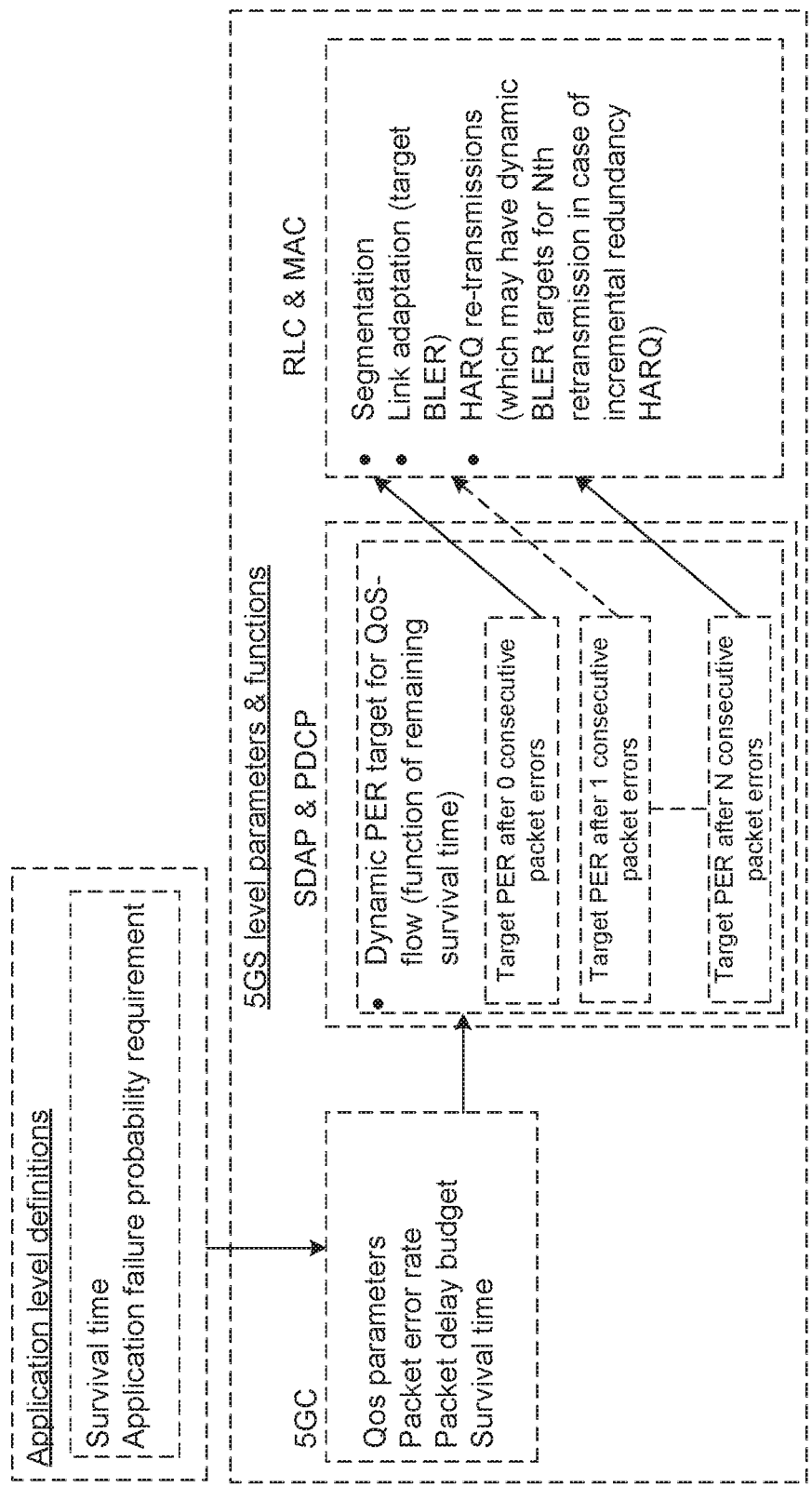
FIG. 4 is a diagram illustrating some functionality of some layers of the network node according to an example embodiment.

FIG. 4 is a diagram illustrating some functionality of some layers of the network node according to an example embodiment. An example new QoS parameter is provided as a "survival time" (new QoS parameter) and reflected in the network as dynamic PER targets within survival time as one example. Likewise, dynamic PER targets per packet transmission error may be used or provided. According to an example embodiment, one example purpose of a PER target may be to provide input to link adaptation or to provide improved reliability, e.g., via multi-connectivity (MC) and packet duplication or other methods that RAN has available. Dynamic PER may be used (e.g., where PER changes based on changes to M or Tr), to improve reliability or to avoid expiration of the survival time or M=N, either of which means that there is an application level failure. Thus, in this manner, for example, application availability may be improved, e.g., by ensuring that survival time is not exceeded.

Application level definitions may include survival time (Ts), and application failure probability requirement. Other application level parameters may be defined—such as N or a maximum number of packet transmission errors before application failure, or the number of errors that would cause an application failure.

5GS (5G system), which may include 5G network elements, e.g., RAN (or BS or other RAN node), CN (core network entities), UE (or user device) level parameters and functions are shown. For 5GC (5G core network), QoS parameters or reliability parameters may include packet error rate (PER), packet delay budget, and survival time (Ts). SDAP (service data application protocol) and PDCP (packet data control protocol) functions are shown, including determining or selecting dynamic PER target (or reliability target), e.g., based on remaining survival time (Tr) or number of packet transmission errors (M).

PDCP layer—large packet, with a target PER for next packet transmission assigned based on Tr (remaining survival time for flow) or M (number of consecutive packet transmission errors for flow). RLC (radio link control) and MAC (media access control) layers are shown. RLC may perform segmentation of packet into code blocks. One or more adjustments to a communication parameter or configuration may be performed by RLC and/or MAC layers of network node based on PER target (or reliability target), e.g., link adaptation, adjusting MCS, or other adjustments to a communication parameter(s) or configuration. MAC layer may perform link adaptation (e.g., which may include adjusting MCS and/or adjusting allocation of time-frequency resources for transmission of each code block(s) for next packet of flow) based on target PER; MAC may determine a target BLER for the code blocks based on the target PER.

But, there may not be enough robust MCS options to improve reliability; so RAN or network node may implement, for example, multi-connectivity and duplicate traffic over secondary link; this is also based on target PER (or reliability target) and state of current link (e.g., too much interference, based on UE reports indicating RSSI, SINR, RSRQ—thus, merely a more robust MCS will not provide sufficient reliability, in this example), so need to use additional links through multi-connectivity.

RLC layer may segment large SDAP or PDCP packet into smaller packets. Next, some non-limiting examples of usage of the invention to specific resource optimizations are given:

EXAMPLE(S)

In case of multi-connectivity, the techniques described herein, e.g., dynamic reliability targets, allows avoiding unnecessary data duplication (e.g., for lower M or higher Tr values), as well as to utilize the more efficient link adaptation in secondary gNB.

Figure 5:
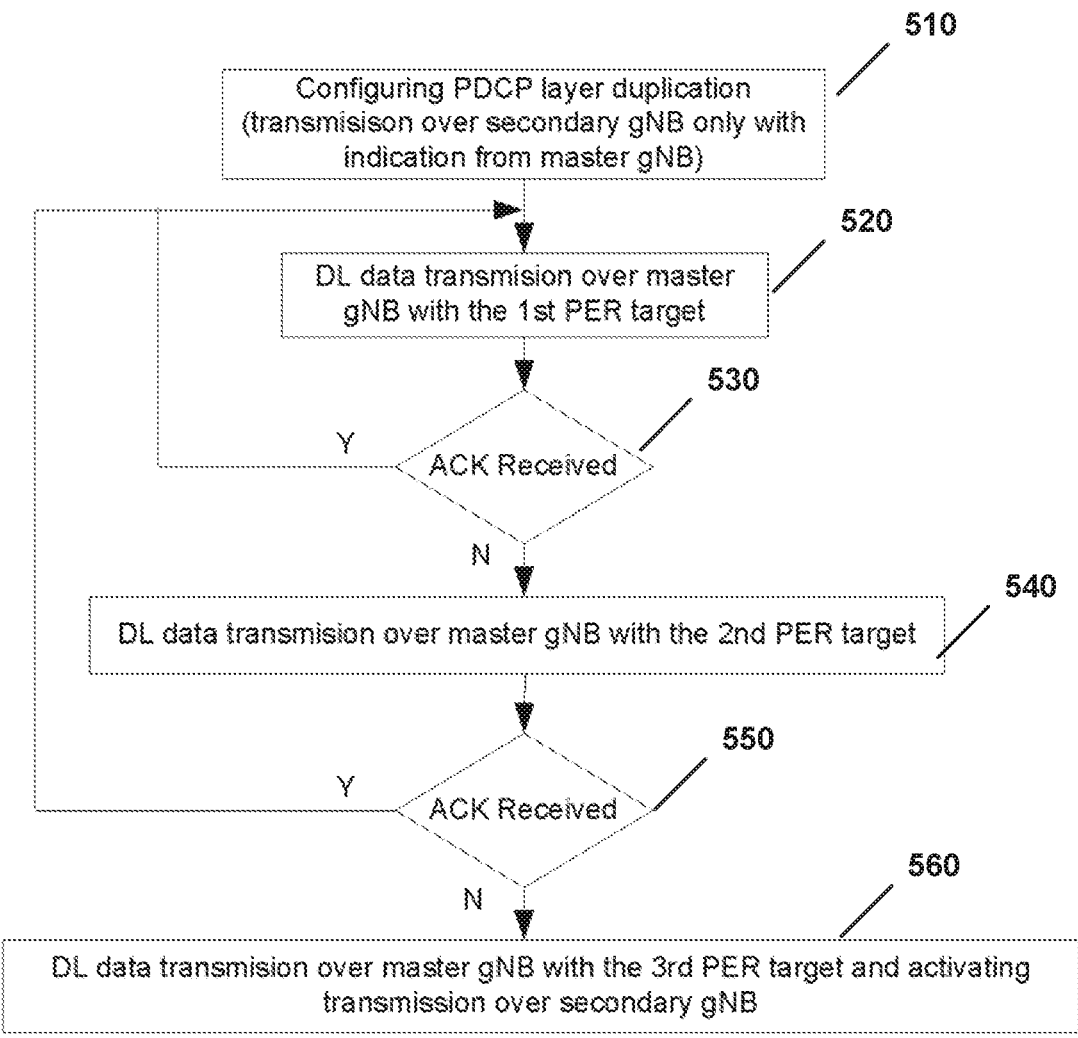
FIG. 5 is a diagram illustrating an example behavior of a network node according to an example embodiment.

FIG. 5 is a diagram illustrating an example behavior of a network node according to an example embodiment. At 510, the network node may configure a secondary BS for duplication transmission. At 520, a DL data transmission to UE over master BS is performed using communication parameter(s) and configuration for (or associated with) the first PER target. At 530, an ACK is not received by network node or master BS for this packet. This causes network node to decrease target PER (to a stricter PER) for next packet transmission to $2^{nd}$ PER target (based on this packet transmission error). At 540, a DL data transmission to UE over master BS/network node is performed using communication parameter(s) and configuration for the $2^{nd}$ PER target. At 550, an ACK is not received by network node or master BS for this packet. Again, network node or master BS adjusts target PER to the $3^{rd}$ target PER (based on this additional packet transmission error), and at 560, the network node or master BS/gNB transmits packet to UE, using the configuration or parameters associated with the $3^{rd}$ PER target, which includes activating duplicated transmission over secondary BS/gNB. Similar to the above two examples, RAN or network node may dynamically configure any other feature or configuration which impacts packet error probability (e.g. HARQ, K-repetition) to improve and/or optimize the reliability and/or spectral efficiency.

In addition, the overall system interference can be reduced as well on top of the reduced resource waste: a higher spectral efficiency of the link translates also to lower interference towards other cells/UEs, and thus improves the overall system performance.

It is also worth noting in principle dynamic PER target could implemented also outside RAN. E.g., CN could continuously change QCI (QoS class identifier) for the QoS flow to adapt PER targets. This would, however, lead to unnecessary additional signaling between RAN or network node and CN without any additional value (unless CN applies multi-connectivity above RAN/network node). In addition, RAN or network node may have the best knowledge of radio channel conditions and radio resource usage which may further help in selection of dynamic PER targets (by using local or other proprietary algorithms).

Some further example embodiments are now described.

Figure 6:
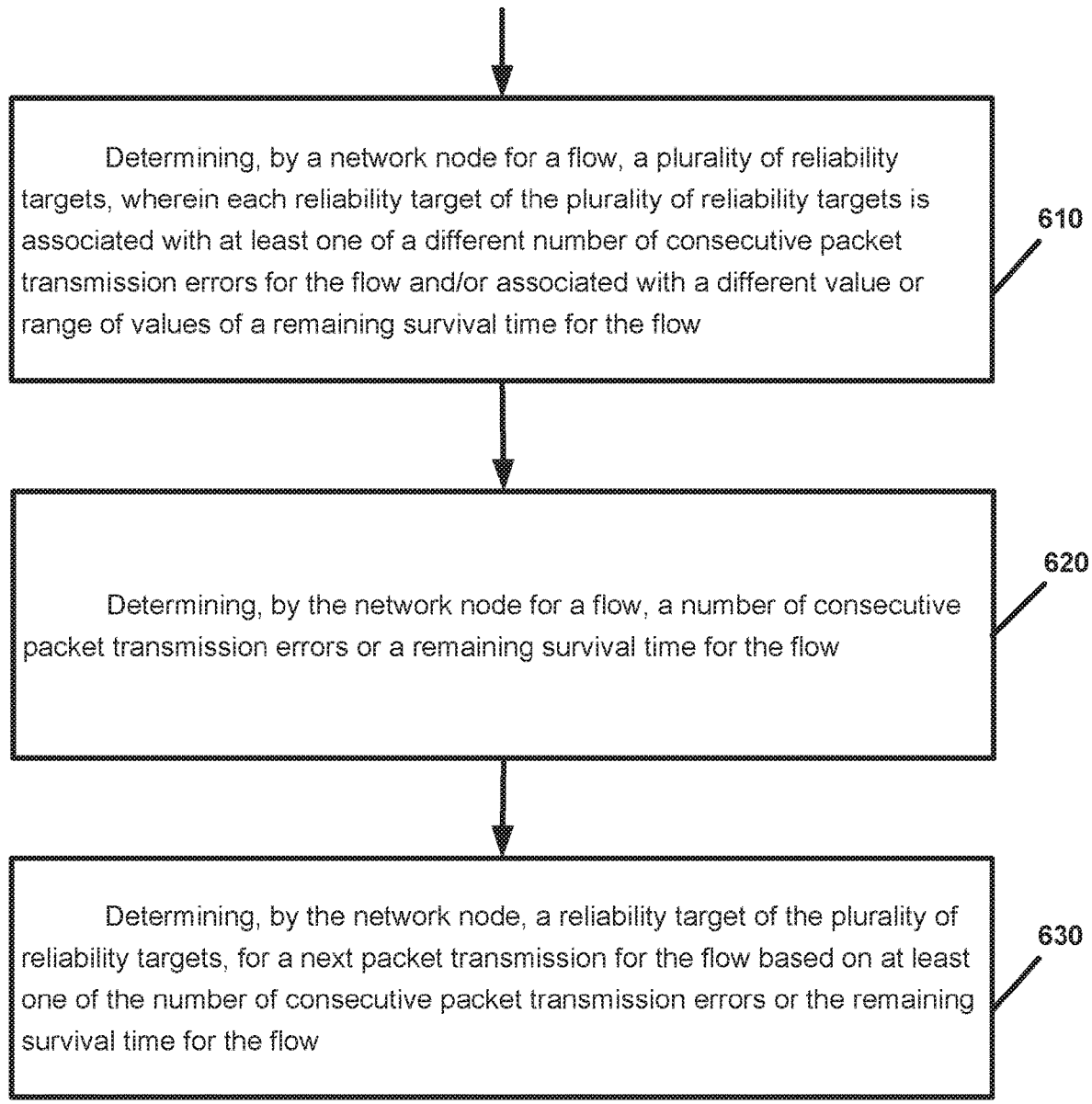
FIG. 6 is a flow chart illustrating operation of a network node according to an example embodiment.

Example 1. FIG. 6 is a flow chart illustrating operation of a network node according to an example embodiment. Operation 610 includes determining, by a network node for a flow, a plurality of reliability targets, wherein each reliability target of the plurality of reliability targets is associated with a different number of consecutive packet transmission errors for the flow and/or associated with at least one of a different value or range of values of a remaining survival time for the flow. Operation 620 includes determining, by the network node for a flow, a number of consecutive packet transmission errors and/or a remaining survival time for the flow. And, operation 630 includes determining, by the network node, a reliability target of the plurality of reliability targets, for a next packet transmission for the flow based on at least one of the number of consecutive packet transmission errors or the remaining survival time for the flow.

Example 2. The method of example 1 and further comprising: determining, by a network node, reliability target information; wherein the determining, by the network node for a flow, a plurality of reliability targets comprises: determining, by the network node based on at least a portion of the reliability target information for a flow, a plurality of reliability targets.

Example 3. The method of any of examples 1-2 wherein the network node comprises at least one of the following: a base station; an access point (AP); an eNB or gNB; a user device or user equipment (UE); a wireless relay station or relay node; a core network (CN) entity.

Example 4. The method of any of examples 1-3 and further comprising: adjusting, by the network node, a communication parameter or configuration for the flow based on the reliability target for the next packet transmission for the flow; and Example 5. The method of example 4 and further comprising: transmitting or receiving, by the network node, the next packet of the flow based on the adjusted communication parameter or configuration for the flow.

Example 6. The method of any of examples 2-5 wherein the determining, by the network node, reliability target information comprises at least one of: determining, by the network node, the reliability target information that is preconfigured based on an application or user device associated with the flow; and receiving, by the network node from a core network or other network entity, the reliability target information.

Example 7. The method of any of examples 1-6 wherein the reliability target of the plurality of reliability targets for a next packet transmission comprises at least one of the following: a packet error ratio (PER) target; a packet error probability target; an availability target; a reliability target, measured or indicated as either a mean time between failures, or a probability of failure; a failure rate; a latency requirement target; and a quality of service (QoS) parameter.

Example 8. The method of any of examples 2-7 wherein the receiving reliability target information comprises receiving, by the network node, information that can be used by the network node to determine at least one of: a packet error ratio (PER) target for each of a plurality of numbers (M) of consecutive packet transmission errors for the flow; and, a packet error ratio (PER) target for each of a plurality of values or ranges of a remaining survival time (Tr) for the flow.

Example 9. The method of any of examples 2-8 wherein the reliability target information comprises at least one of: information identifying a target packet error ratio (PER) for each of a plurality of numbers (M) of consecutive packet transmission errors for the flow; and information identifying a target packet error ratio (PER) for each of a plurality of values or ranges of a remaining survival time (Tr) for the flow.

Example 10. The method of any of examples 1-9, wherein the network node comprises a primary (or master) base station that provides a primary link to a user device for the flow, the method further comprising: transmitting, by the primary base station to a secondary base station that is configured to provide a secondary link to the user device for the flow, at least a portion of the reliability target information.

Example 11. The method of any of examples 4-10, wherein the adjusting, by the network node, a communication parameter or configuration for the flow based on the reliability target for the next packet transmission for the flow comprises performing at least one of the following for the flow: adjusting a modulation and coding scheme (MCS) for the flow; adjusting transmission power for the flow; configuring use of multi-connectivity that provides multiple wireless links for the flow; configuring use of multi-carrier, that provides multiple carriers for the flow; configuring use of transmission of duplicate data or duplicate packets on two or more wireless links for the flow; configuring use of interference coordination for the flow; and configuring use of semi-persistent scheduling of resources for the flow; adjusting a time diversity by configuring a repeat transmission of data over time for the flow; adjusting a frequency diversity by configuring carrier aggregation or frequency hopping for the flow; adjusting a spatial diversity by adjusting a number of transmit/receive antennas used for the flow; and configuring cooperative diversity or sidelink assistance, in which a transmitted packet of the flow is received by multiple user devices, and wherein at least one of the user devices forwards or relays the packet to the other user device to increase reliability.

Example 12. The method of any of examples 2-11, wherein the reliability target information comprises at least one of: a maximum or minimum reliability target for N or more consecutive packet transmission errors for the flow;

and a maximum or minimum reliability target after the remaining survival time (Tr) for the flow is zero or has expired.

Example 13. The method of any of examples 1-12, wherein the reliability target comprises a packet error ratio, and wherein the reliability target information comprises at least one of: a maximum allowed packet error ratio (PER) after N or more consecutive packet transmission errors have been detected for the flow, where both N and the maximum allowed packet error ratio (PER) are included in the reliability target information; and a maximum allowed packet error ratio (PER) after the remaining survival time (Tr) for the flow is zero or has expired, where the remaining survival time (Tr) for the flow is zero or has expired when the elapsed time, during which one or more consecutive packet transmission errors for the flow have been detected, is greater than or equal to the survival time (Ts) for the flow.

Example 14. An apparatus comprising means for performing a method of any of examples 1-13.

Example 15. A non-transitory computer-readable storage medium comprising instructions stored thereon that, when executed by at least one processor, are configured to cause a computing system to perform the method of any of examples 1-13.

Example 16. An apparatus comprising at least one processor and at least one memory including computer instructions, when executed by the at least one processor, cause the apparatus to perform a method of any of examples 1-13.

Example 17. An apparatus comprising at least one processor and at least one memory including computer instructions, when executed by the at least one processor, cause the apparatus to: determine, by a network node for a flow, a plurality of reliability targets, wherein each reliability target of the plurality of reliability targets is associated with at least one of a different number of consecutive packet transmission errors for the flow and/or associated with a different value or range of values of a remaining survival time for the flow; determine, by the network node for a flow, a number of consecutive packet transmission errors or a remaining survival time for the flow; and determine, by the network node, a reliability target of the plurality of reliability targets, for a next packet transmission for the flow based on at least one of the number of consecutive packet transmission errors or the remaining survival time for the flow.

Example 18. The apparatus of example 17 further causing the apparatus to: determine, by a network node, reliability target information; wherein causing the apparatus to determine, by the network node for a flow, a plurality of reliability targets comprises causing the apparatus to: determine, by the network node based on at least a portion of the reliability target information for a flow, a plurality of reliability targets.

Example 19. The apparatus of any of examples 17-18, wherein the network node comprises at least one of the following: a base station; an access point (AP); an eNB or gNB; a user device or user equipment (UE); a wireless relay station or relay node; a core network (CN) entity.

Example 20. The apparatus of any of examples 17-19 and further causing the apparatus to: adjust, by the network node, a communication parameter or configuration for the flow based on the reliability target for the next packet transmission for the flow.

Example 21. The apparatus of example 20 and further causing the apparatus to: transmit or receive, by the network node, the next packet of the flow based on the adjusted communication parameter or configuration for the flow.

Example 22. The apparatus of any of examples 18-21 wherein causing the apparatus to determine, by the network node, reliability target information comprises causing the apparatus to perform at least one of: determine, by the network node, the reliability target information that is pre-configured based on an application or user device associated with the flow; and receive, by the network node from a core network or other network entity, the reliability target information.

Example 23. The apparatus of any of examples 17-22 wherein the reliability target comprises at least one of the following: a packet error ratio (PER) target; a packet error probability target; an availability target; a reliability target, measured or indicated as either a mean time between failures, or a probability of failure; a failure rate; a latency requirement target; and a quality of service (QoS) parameter.

Example 24. The apparatus of any of examples 18-23 wherein causing the apparatus to receive reliability target information comprises causing the apparatus to receive, by the network node, information that can be used by the network node to determine at least one of: a packet error ratio (PER) target for each of a plurality of numbers (M) of consecutive packet transmission errors for the flow; a packet error ratio (PER) target for each of a plurality of values or ranges of a remaining survival time (Tr) for the flow.

Example 25. The apparatus of any of examples 18-24 wherein the reliability target information comprises at least one of: information identifying a target packet error ratio (PER) for each of a plurality of numbers (M) of consecutive packet transmission errors for the flow; and information identifying a target packet error ratio (PER) for each of a plurality of values or ranges of a remaining survival time (Tr) for the flow.

Example 26. The apparatus of any of examples 17-25, wherein the network node comprises a primary (or master) base station that provides a primary link to a user device for the flow, and further causing the apparatus to: transmit, by the primary base station to a secondary base station that is configured to provide a secondary link to the user device for the flow, at least a portion of the reliability target information.

Example 27. The apparatus of any of examples 20-26, wherein causing the apparatus to adjust, by the network node, a communication parameter or configuration for the flow based on the reliability target for the next packet transmission for the flow comprises causing the apparatus to perform at least one of the following for the flow: adjust a modulation and coding scheme (MCS) for the flow; adjust transmission power for the flow; configure use of multi-connectivity that provides multiple wireless links for the flow; configure use of multi-carrier, that provides multiple carriers for the flow; configure use of transmission of duplicate data or duplicate packets on two or more wireless links for the flow; configure use of interference coordination for the flow; and configure use of semi-persistent scheduling of resources for the flow; adjust a time diversity by configuring a repeat transmission of data over time for the flow; adjust a frequency diversity by configuring carrier aggregation or frequency hopping for the flow; adjust a spatial diversity by adjusting a number of transmit/receive antennas used for the flow; and configure cooperative diversity or sidelink assistance, in which a transmitted packet of the flow is received by multiple user devices, and wherein at least one of the user devices forwards or relays the packet to the other user device to increase reliability.

Example 28. The apparatus of any of examples 18-27, wherein the reliability target information comprises at least one of: a strictest reliability target for N or more consecutive packet transmission errors for the flow; and a strictest reliability target after the remaining survival time (Tr) for the flow is zero or has expired.

Example 29. The apparatus of any of examples 18-28, wherein the reliability target comprises a packet error ratio, and wherein the reliability target information comprises at least one of: a maximum allowed packet error ratio (PER) after N or more consecutive packet transmission errors have been detected for the flow, where both N and the maximum allowed packet error ratio (PER) are included in the reliability target information; and a maximum allowed packet error ratio (PER) after the remaining survival time (Tr) for the flow is zero or has expired, where the remaining survival time (Tr) for the flow is zero or has expired when the elapsed time, during which one or more consecutive packet transmission errors for the flow have been detected, is greater than or equal to the survival time (Ts) for the flow.

Figure 7:
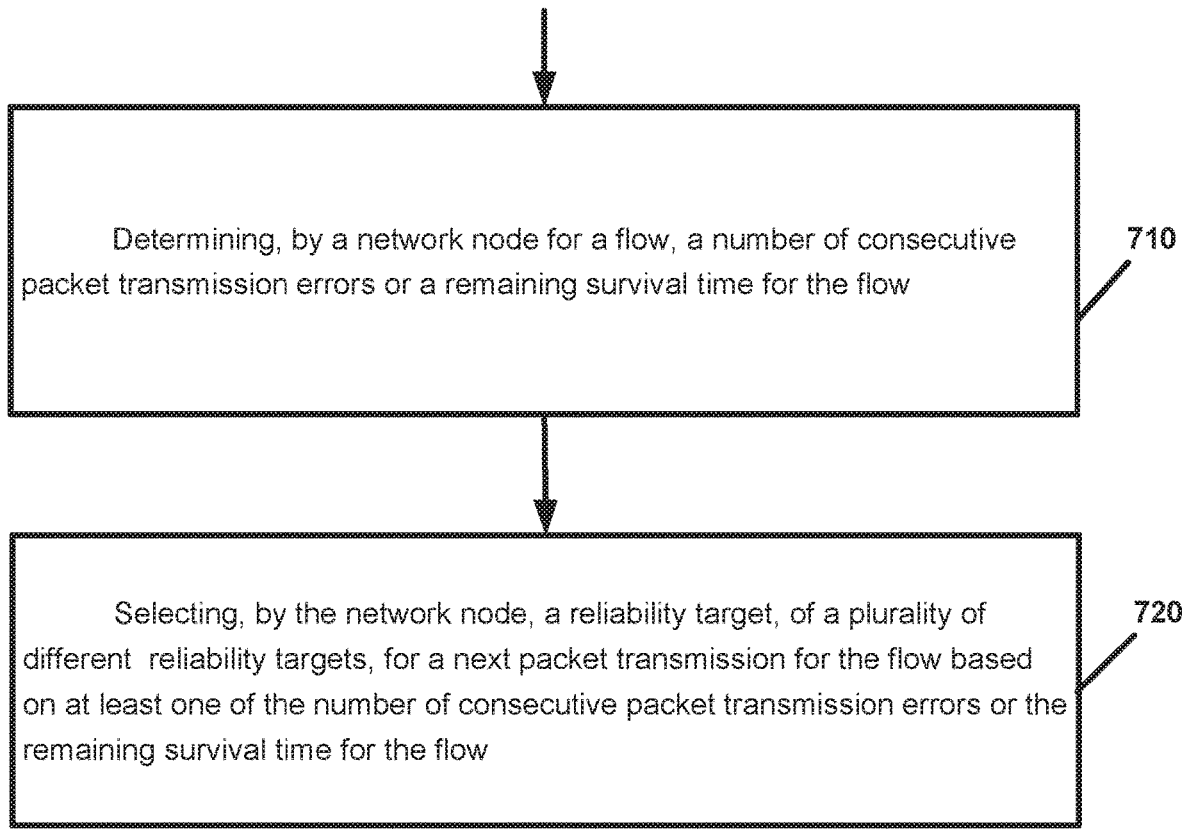
FIG. 7 is a flow chart illustrating operation of a network node according to another example embodiment.

Example 30. FIG. 7 is a flow chart illustrating operation of a network node according to another example embodiment. Operation 710 includes determining, by a network node for a flow, a number of consecutive packet transmission errors or a remaining survival time for the flow. Operation 720 includes selecting, by the network node, a reliability target, of a plurality of different reliability targets, for a next packet transmission for the flow based on at least one of the number of consecutive packet transmission errors or the remaining survival time for the flow.

Example 31. The method of example 30 and further comprising determining, by a network node, reliability target information; wherein the selecting comprises selecting, by the network node, a reliability target, of a plurality of different reliability targets, for a next packet transmission for the flow based on at least a portion of the reliability target information and at least one of the number of consecutive packet transmission errors or the remaining survival time for the flow.

Example 32. The method of any of examples 30-31, and further comprising determining, by a network node, reliability target information; wherein the selecting, by the network node, a reliability target for the next packet transmission comprises: determining, by the network node based on at least a portion of the reliability target information for the flow, a plurality of reliability targets, wherein each reliability target of the plurality of reliability targets is associated with a different number of consecutive packet transmission errors for the flow and/or associated with a different value or a different range of values of a remaining survival time for the flow; and selecting, by the network node, a reliability target of the plurality of reliability targets for a next packet transmission for the flow based on at least one of the number of consecutive packet transmission errors or the remaining survival time for the flow.

Example 33. The method of any of examples 30-32 and further comprising: adjusting, by the network node, a communication parameter or configuration for the flow based on the reliability target for the next packet transmission for the flow; and transmitting or receiving, by the network node, the next packet of the flow based on the adjusted communication parameter or configuration for the flow.

Example 34. The method of any of examples 30-33 wherein the reliability target of the plurality of reliability targets for a next packet transmission comprises at least one of the following: a packet error ratio (PER) target; a packet error probability target; an availability target; a reliability target, measured or indicated as either a mean time between failures, or a probability of failure; a failure rate; a latency requirement target; and a quality of service (QoS) parameter.

Example 35. The method of any of examples 33-34, wherein the adjusting, by the network node, a communication parameter or configuration for the flow based on the reliability target for the next packet transmission for the flow comprises performing at least one of the following for the flow: adjusting a modulation and coding scheme (MCS) for the flow; adjusting transmission power for the flow; configuring use of multi-connectivity that provides multiple wireless links for the flow; configuring use of multi-carrier, that provides multiple carriers for the flow; configuring use of transmission of duplicate data or duplicate packets on two or more wireless links for the flow; configuring use of interference coordination for the flow; configuring use of semi-persistent scheduling of resources for the flow; adjusting a time diversity by configuring a repeat transmission of data over time for the flow; adjusting a frequency diversity by configuring carrier aggregation or frequency hopping for the flow; adjusting a spatial diversity by adjusting a number of transmit/receive antennas used for the flow; and configuring cooperative diversity or sidelink assistance, in which a transmitted packet of the flow is received by multiple user devices, and wherein at least one of the user devices forwards or relays the packet to the other user device to increase reliability.

Example. 36. The method of any of examples 30-35 wherein the network node comprises at least one of the following: a base station; an access point (AP); an eNB or gNB; a user device or user equipment (UE); a wireless relay station or relay node; a core network (CN) entity.

Figure 8:
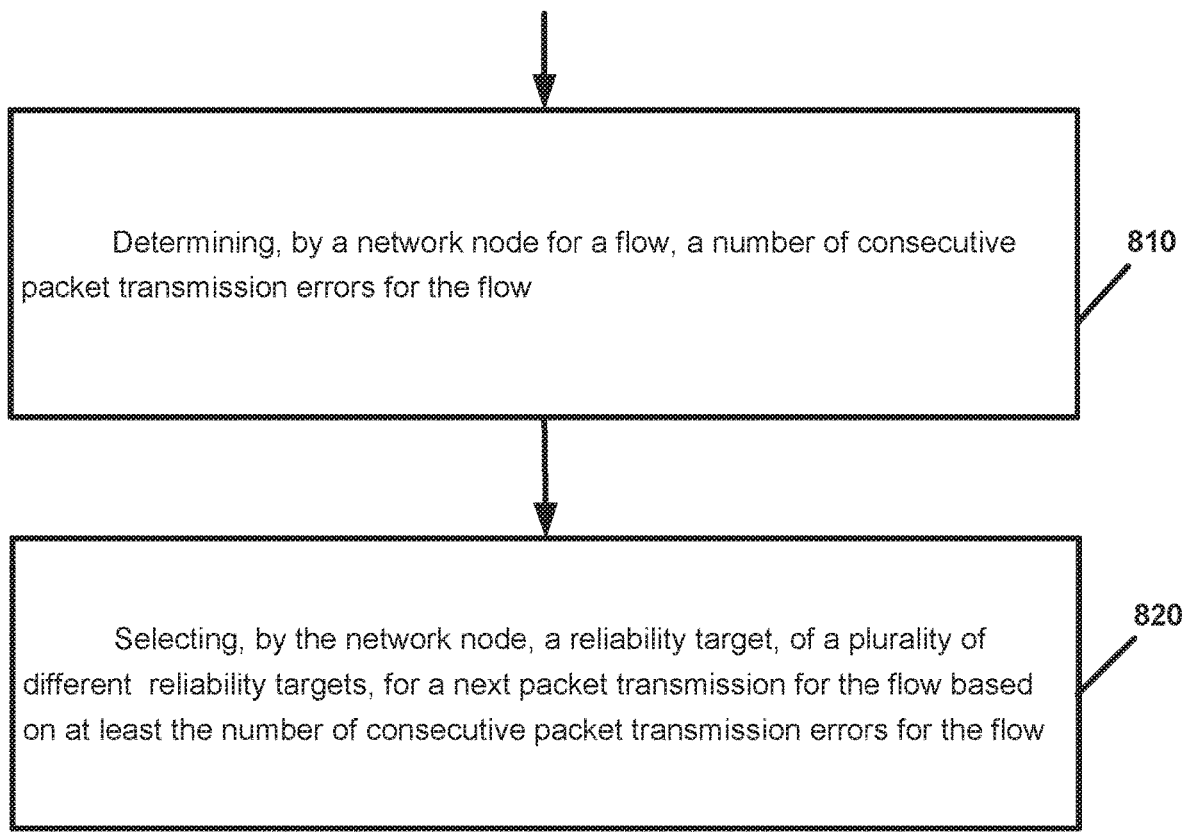
FIG. 8 is a flow chart illustrating operation of a network node according to another example embodiment.

Example 37. FIG. 8 is a flow chart illustrating operation of a network node according to another example embodiment. Operation 810 includes determining, by a network node for a flow, a number of consecutive packet transmission errors for the flow. And, Operation 820 includes selecting, by the network node, a reliability target, of a plurality of different reliability targets, for a next packet transmission for the flow based on at least the number of consecutive packet transmission errors for the flow.

Figure 9:
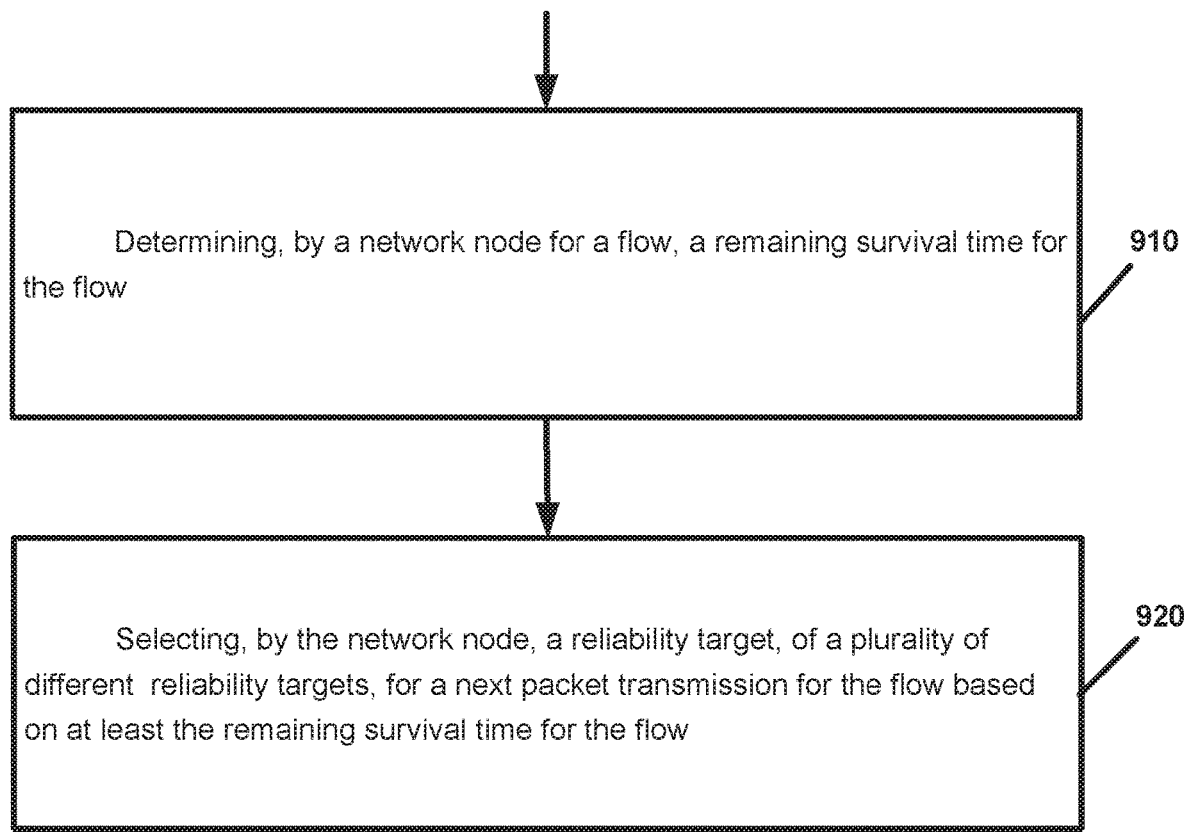
FIG. 9 is a flow chart illustrating operation of a network node according to another example embodiment.

Example 38. FIG. 9 is a flow chart illustrating operation of a network node according to another example embodiment. Operation 910 includes determining, by a network node for a flow, a remaining survival time for the flow. And, operation 920 includes selecting, by the network node, a reliability target, of a plurality of different reliability targets, for a next packet transmission for the flow based on at least the remaining survival time for the flow.

Example 39. An apparatus comprising means for performing a method of any of examples 30-38.

Example 40. A non-transitory computer-readable storage medium comprising instructions stored thereon that, when executed by at least one processor, are configured to cause a computing system to perform the method of any of examples 30-38.

Example 41. An apparatus comprising at least one processor and at least one memory including computer instructions, when executed by the at least one processor, cause the apparatus to perform a method of any of examples 30-38.

Figure 10:
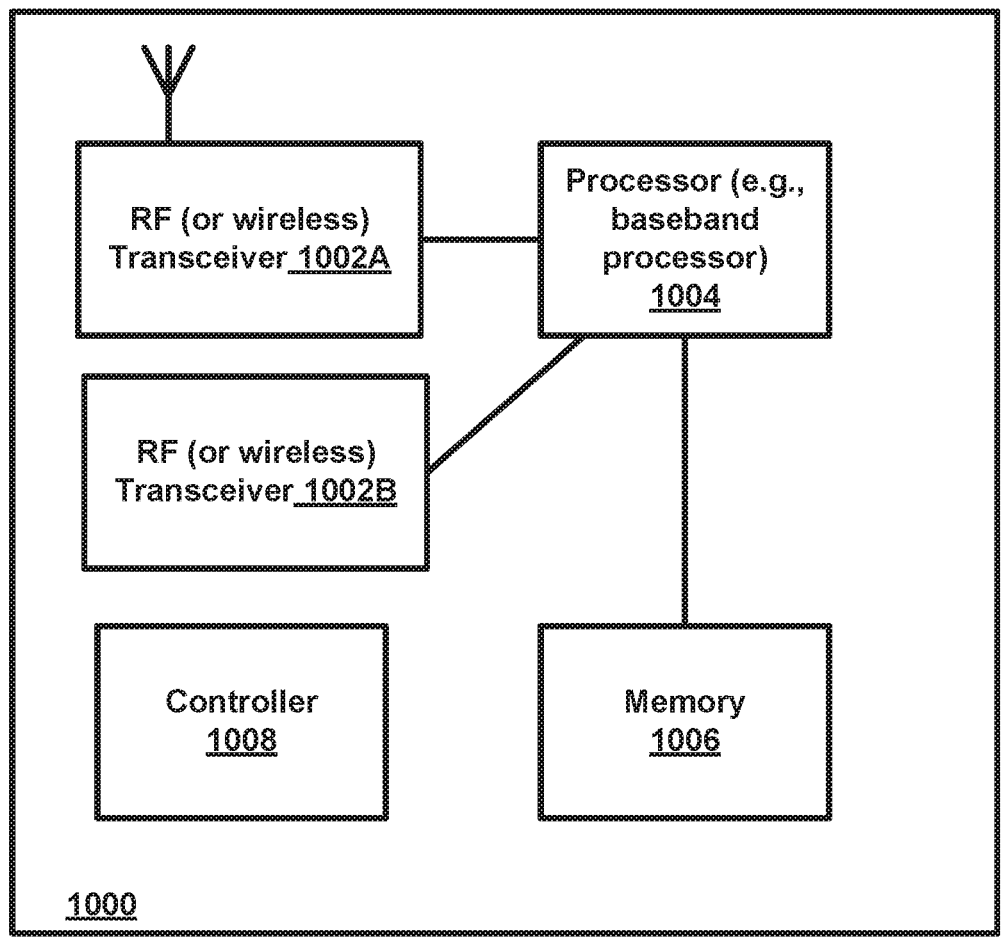
FIG. 10 is a block diagram of a wireless station or a network node (e.g., AP/BS/gNB, a user device/UE, a wireless relay station/relay node, a core network entity, a RAN entity, or other network node or network entity) according to an example implementation.

FIG. 10 is a block diagram of a wireless station or a network node (e.g., AP/BS/gNB, a user device/UE, a wireless relay station/relay node, a core network entity, a RAN (radio access network) entity, . . . ) 1000 according to an example implementation. The wireless station (or network node) 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented or provided as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network. Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   determining, by a network node for a flow, a remaining survival time for the flow;
   determining, by the network node, a plurality of different reliability targets,
   determining, by the network node, reliability target information, wherein the determining, by the network node, the plurality of different reliability targets is based on at least a portion of the reliability target information for the flow, and each reliability target of the plurality of different reliability targets is associated with a different value or a different range of values of the remaining survival time for the flow,
   wherein the reliability target information comprises at least one of:
      information identifying a target packet error ratio (PER) for each of a plurality of values or ranges of the remaining survival time for the flow;
      a maximum or minimum reliability target after the remaining survival time for the flow is zero or has expired; and
      a maximum allowed PER after the remaining survival time for the flow is zero or has expired, where the remaining survival time for the flow is zero or has expired when an elapsed time, during which one or more consecutive packet transmission errors for the flow have been detected, is greater than or equal to the remaining survival time for the flow; and
   selecting, by the network node, a next reliability target, of the plurality of different reliability targets, for a next packet transmission for the flow based on the remaining survival time for the flow.

2. The method of claim 1, wherein the determining, by the network node, the reliability target information comprises at least one of:
   determining, by the network node, the reliability target information that is preconfigured based on an application or a user device associated with the flow; and
   receiving, by the network node form a core network or other network entity, the reliability target information.

3. The method of claim 2, wherein the receiving the reliability target information comprises receiving, by the network node, information that can be used by the network node to determine a packet error ratio, PER, target for each of a plurality of values or ranges of the remaining survival time for the flow.

4. The method of claim 1, wherein the network node comprises a primary base station that provides a primary link to a user device for the flow, the method further comprising:
   transmitting, by the primary base station to a secondary base station that is configured to provide a secondary link to the user device for the flow, at least the portion of the reliability target information.

5. The method of claim 1, further comprising:
   adjusting, by the network node, a communication parameter or configuration for the flow based on the reliability target for the next packet transmission for the flow; and
   transmitting or receiving, by the network node, the next packet of the flow based on the adjusted communication parameter or configuration for the flow.

6. The method of claim 5, wherein the adjusting, by the network node, the communication parameter or the configuration for the flow based on the reliability target for the next packet transmission for the flow comprises performing at least one of the following for the flow:
   adjusting a modulation and coding scheme for the flow;
   adjusting transmission power for the flow;
   configuring use of multi-connectivity that provides multiple wireless links for the flow;

configuring use of multi-carrier, that provides multiple carriers for the flow;
configuring use of transmission of duplicate data or duplicate packets on two or more wireless links for the flow;
configuring use of interference coordination for the flow; and
configuring use of semi-persistent scheduling of resources for the flow;
adjusting a time diversity by configuring a repeat transmission of data over time for the flow;
adjusting a frequency diversity by configuring carrier aggregation or frequency hopping for the flow;
adjusting a spatial diversity by adjusting a number of transmit/receive antennas used for the flow; and
configuring cooperative diversity or sidelink assistance, in which a transmitted packet of the flow is received by multiple user devices, and wherein at least one of the user devices forwards or relays the packet to other user device to increase reliability.

7. An apparatus comprising:
at least one processor; and
at least one memory including computer program codes;
the at least one memory and the computer program codes are configured to, with the at least one processor, cause the apparatus to:
determine for a flow, a remaining survival time for the flow;
wherein the at least one memory and the computer program codes are configured to, with the at least one processor, cause the apparatus to determine a plurality of different reliability targets,
wherein the at least one memory and the computer program codes are configured to, with the at least one processor, cause the apparatus to determine reliability target information, wherein the determining the plurality of different reliability targets is based on at least a portion of the reliability target information for the flow, and each reliability target of the plurality of different reliability targets is associated with a different value or a different range of values of the remaining survival time for the flow,
wherein the reliability target information comprises at least one of:
information identifying a target packet error ratio (PER) for each of a plurality of values or ranges of the remaining survival time for the flow;
a maximum or minimum reliability target after the remaining survival time for the flow is zero or has expired; and
a maximum allowed PER after the remaining survival time for the flow is zero or has expired, where the remaining survival time for the flow is zero or has expired when an elapsed time, during which one or more consecutive packet transmission errors for the flow have been detected, is greater than or equal to the remaining survival time for the flow; and
select a next reliability target, of the plurality of different reliability targets, for a next packet transmission for the flow based on the remaining survival time for the flow.

8. The apparatus of claim 7, wherein the determining the reliability target information comprises at least one of:
determining the reliability target information that is preconfigured based on an application or a user device associated with the flow; and
receiving from a core network or other network entity, the reliability target information.

9. The apparatus of claim 8, wherein the receiving the reliability target information comprises receiving information that can be used by the apparatus to determine a packet error ratio, PEG, target for each of a plurality of values or ranges of the remaining survival time for the flow.

10. The apparatus of claim 7, wherein the apparatus comprises a primary base station that provides a primary link to a user device for the flow, wherein the at least one memory and the computer program codes are configured to, with the at least one processor, cause the apparatus to:
transmit to a secondary base station that is configured to provide a secondary link to the user device for the flow, at least the portion of the reliability target information.

11. The apparatus of claim 7, wherein the at least one memory and the
computer program codes are configured to, with the at least one processor, cause the apparatus to:
adjust a communication parameter or configuration for the flow based on the reliability target for the next packet transmission for the flow; and
transmit or receive the next packet of the flow based on the adjusted communication parameter or configuration for the flow.

12. The apparatus of claim 11, wherein the adjusting the communication parameter or the configuration for the flow based on the reliability target for the next packet transmission for the flow comprises performing at least one of the following for the flow:
adjusting a modulation and coding scheme for the flow;
adjusting transmission power for the flow;
configuring use of multi-connectivity that provides multiple wireless links for the flow;
configuring use of multi-carrier, that provides multiple carriers for the flow;
configuring use of transmission of duplicate data or duplicate packets on two or more wireless links for the flow;
configuring use of interference coordination for the flow; and
configuring use of semi-persistent scheduling of resources for the flow;
adjusting a time diversity by configuring a repeat transmission of data over time for the flow;
adjusting a frequency diversity by configuring carrier aggregation or frequency hopping for the flow;
adjusting a spatial diversity by adjusting a number of transmit/receive antennas used for the flow; and
configuring cooperative diversity or sidelink assistance, in which a transmitted packet of the flow is received by multiple user devices, and wherein at least one of the user devices forwards or relays the packet to other user device to increase reliability.

13. The apparatus of claim 7, wherein the reliability target of the plurality of different reliability targets for a next packet transmission comprises at least one of the following:
a packet error ratio, PER, target;
a packet error probability target;
an availability target;
a reliability target, measured or indicated as either a mean time between failures, or a probability of failure;
a failure rate;
a latency requirement target; and
a quality of service, QoS, parameter.

14. A non-transitory computer readable medium comprising program instructions for causing an apparatus to perform at least the following:

determining, by a network node for a flow, a remaining survival time for the flow;

determining, by the network node, a plurality of different reliability targets, determining, by the network node, reliability target information, wherein the determining, by the network node, the plurality of different reliability targets is based on at least a portion of the reliability target information for the flow, and each reliability target of the plurality of different reliability targets is associated with a different value or a different range of values of the remaining survival time for the flow, wherein the reliability target information comprises at least one of:

information identifying a target packet error ratio (PER) for each of a plurality of values or ranges of the remaining survival time for the flow;

a maximum or minimum reliability target after the remaining survival time for the flow is zero or has expired; and a maximum allowed PER after the remaining survival time for the flow is zero or has expired, where the remaining survival time for the flow is zero or has expired when an elapsed time, during which one or more consecutive packet transmission errors for the flow have been detected, is greater than or equal to the remaining survival time for the flow; and selecting, by the network node, a next reliability target, of the plurality of different reliability targets, for a next packet transmission for the flow based on the remaining survival time for the flow.

\* \* \* \* \*